US010241649B2

(12) United States Patent
Sirpal

(10) Patent No.: US 10,241,649 B2
(45) Date of Patent: Mar. 26, 2019

(54) SYSTEM AND METHODS FOR APPLICATION DISCOVERY AND TRIAL

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao, P.R.C. (CN)

(72) Inventor: Sanjiv Sirpal, Oakville (CA)

(73) Assignee: Qingdao Hisense Electronics Co., Ltd., Qingdao (CN)

( * ) Notice: Subject to any disclaimer, the term of this patent is extended or adjusted under 35 U.S.C. 154(b) by 230 days.

(21) Appl. No.: 15/133,870

(22) Filed: Apr. 20, 2016

(65) Prior Publication Data

US 2016/0378321 A1 Dec. 29, 2016

Related U.S. Application Data

(60) Provisional application No. 62/184,476, filed on Jun. 25, 2015, provisional application No. 62/183,613, filed on Jun. 23, 2015.

(51) Int. Cl.
*G06F 3/01* (2006.01)
*G06F 3/16* (2006.01)
(Continued)

(52) U.S. Cl.
CPC ............ *G06F 3/0482* (2013.01); *G06F 3/017* (2013.01); *G06F 3/0481* (2013.01);
(Continued)

(58) Field of Classification Search
CPC .. G06Q 20/322; G06Q 30/02; G06Q 30/0631; G06Q 20/123; G06Q 20/12; G06F 8/61; G06F 21/10; G06F 21/57; G06F 3/0482; G06F 3/0481; G06F 3/04817; G06F 3/017; G06F 3/0484; G06F 3/0485;
(Continued)

(56) References Cited

U.S. PATENT DOCUMENTS 5,708,709 A * 1/1998 Rose .......................... G06F 8/61
380/30
8,577,737 B1 * 11/2013 Amacker ............... G06Q 30/00
705/26.1
(Continued)

*Primary Examiner* — Amy M Levy
(74) *Attorney, Agent, or Firm* — Gordon & Rees LLP

(57) ABSTRACT

The present disclosure relates to devices and device configurations. In one embodiment, a process for providing application discovery and trial includes presenting a widget element on a display of the device, wherein the widget element includes graphical elements for a plurality of trial applications, and detecting a selection of one of the trial applications in the widget element. The process also includes updating the display to present a selected trial application based on the selection, wherein presentation of the selected trial application includes display of an overlay element, detecting a selection of the overlay element, and presenting a trial application control window based on the selection of the overlay element, the trial application control window including graphical elements for one or more of terminating, continuing and conversion of the selected trial application.

18 Claims, 3 Drawing Sheets

(51) Int. Cl.
| | |
|---|---|
| *H04N 5/77* | (2006.01) |
| *G06T 11/60* | (2006.01) |
| *G06F 3/0481* | (2013.01) |
| *G06F 3/0482* | (2013.01) |
| *G06F 3/0484* | (2013.01) |
| *G06F 3/0485* | (2013.01) |
| *G06F 3/0488* | (2013.01) |
| *G06F 17/30* | (2006.01) |
| *H04L 12/58* | (2006.01) |
| *H04L 29/08* | (2006.01) |
| *H04N 5/232* | (2006.01) |
| *H04B 1/3827* | (2015.01) |

(52) U.S. Cl.
CPC .......... *G06F 3/0484* (2013.01); *G06F 3/0485* (2013.01); *G06F 3/0488* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/167* (2013.01); *G06F 17/30619* (2013.01); *G06F 17/30705* (2013.01); *G06T 11/60* (2013.01); *H04B 1/3833* (2013.01); *H04L 51/04* (2013.01); *H04L 67/142* (2013.01); *H04N 5/23216* (2013.01); *H04N 5/23245* (2013.01); *H04N 5/77* (2013.01); *G06T 2200/24* (2013.01)

(58) Field of Classification Search
CPC ............. G06F 3/04842; G06F 3/04847; G06F 3/0488; G06F 3/04883; G06F 17/30705; G06F 17/30619; H04N 5/23245; H04N 5/23216; H04B 1/3833; H04L 67/142; H04L 51/04; G06T 11/60; G06T 2200/24
See application file for complete search history.

(56) References Cited

U.S. PATENT DOCUMENTS

| | | | | |
|---|---|---|---|---|
| 9,098,366 B1* | 8/2015 | Adib | ................. | G06F 8/61 |
| 2004/0148229 A1* | 7/2004 | Maxwell | ............. | G06Q 30/0277 |
| | | | | 705/14.73 |
| 2005/0044191 A1* | 2/2005 | Kamada | .................. | G06F 21/10 |
| | | | | 709/223 |
| 2005/0055309 A1* | 3/2005 | Williams | ............. | G06Q 20/102 |
| | | | | 705/40 |
| 2006/0063590 A1* | 3/2006 | Abassi | .................... | A63F 13/12 |
| | | | | 463/29 |
| 2007/0105627 A1* | 5/2007 | Campbell | ................. | G06F 8/60 |
| | | | | 463/40 |
| 2007/0130073 A1* | 6/2007 | Celli | .................... | G06F 21/121 |
| | | | | 705/51 |
| 2007/0233782 A1* | 10/2007 | Tali | ......................... | G06F 8/61 |
| | | | | 709/203 |
| 2009/0037287 A1* | 2/2009 | Baitalmal | ............. | G06F 21/128 |
| | | | | 705/27.1 |
| 2009/0064055 A1* | 3/2009 | Chaudhri | ............ | G06F 3/04817 |
| | | | | 715/863 |
| 2009/0204711 A1* | 8/2009 | Binyamin | ............... | H04L 67/16 |
| | | | | 709/226 |
| 2010/0273456 A1* | 10/2010 | Wolovitz | ............ | G06Q 10/107 |
| | | | | 455/412.2 |
| 2010/0280892 A1* | 11/2010 | Uzunalioglu | .......... | G06Q 30/02 |
| | | | | 705/14.13 |
| 2010/0312817 A1* | 12/2010 | Steakley | .................... | G06F 8/61 |
| | | | | 709/202 |
| 2010/0332581 A1* | 12/2010 | Mills | ......................... | G06F 8/34 |
| | | | | 709/202 |
| 2011/0087975 A1* | 4/2011 | Karsten | ............. | H04M 1/72586 |
| | | | | 715/762 |
| 2011/0295708 A1* | 12/2011 | Shin | ........................ | G06Q 30/00 |
| | | | | 705/26.1 |
| 2011/0296401 A1* | 12/2011 | DePoy | ...................... | G06F 8/60 |
| | | | | 717/174 |
| 2011/0307354 A1* | 12/2011 | Erman | ...................... | G06F 8/60 |
| | | | | 705/27.1 |
| 2012/0032945 A1* | 2/2012 | Dare | ..................... | G06F 3/0481 |
| | | | | 345/418 |
| 2012/0042036 A1* | 2/2012 | Lau | .......................... | G06F 8/61 |
| | | | | 709/217 |
| 2012/0079504 A1* | 3/2012 | Maciocci | ............ | G06F 9/44526 |
| | | | | 719/313 |
| 2012/0167008 A1* | 6/2012 | Zaman | .................... | G06F 3/048 |
| | | | | 715/814 |
| 2012/0209586 A1* | 8/2012 | Mieritz | ................... | G06F 9/455 |
| | | | | 703/22 |
| 2012/0246588 A1* | 9/2012 | Petersen | ................. | G06Q 30/02 |
| | | | | 715/769 |
| 2013/0167135 A1* | 6/2013 | Neumann | ............ | G06F 9/44552 |
| | | | | 717/174 |
| 2013/0326499 A1* | 12/2013 | Mowatt | ..................... | G06F 8/60 |
| | | | | 717/177 |
| 2014/0052683 A1* | 2/2014 | Kirkham | ............ | G06Q 30/0631 |
| | | | | 706/46 |
| 2014/0199962 A1* | 7/2014 | Mohammed | .......... | H04M 15/70 |
| | | | | 455/406 |
| 2014/0219448 A1* | 8/2014 | Froels | ................... | H04W 12/06 |
| | | | | 380/255 |
| 2014/0278860 A1* | 9/2014 | Lee | ..................... | G06Q 30/0214 |
| | | | | 705/14.16 |
| 2014/0330647 A1* | 11/2014 | Christodorescu | .. | G06Q 30/0257 |
| | | | | 705/14.55 |
| 2014/0344041 A1* | 11/2014 | Yeleswarapu | ........ | G06Q 20/322 |
| | | | | 705/14.23 |
| 2015/0058355 A1* | 2/2015 | Naqvi | ................. | G06F 17/3087 |
| | | | | 707/746 |
| 2016/0171191 A1* | 6/2016 | Shimoshimano | ..... | G06F 21/105 |
| | | | | 726/33 |
| 2016/0364394 A1* | 12/2016 | Bostick | ............... | G06F 17/3087 |
| 2016/0379292 A1* | 12/2016 | Mowatt | ...................... | G06F 8/60 |
| | | | | 705/26.7 |
| 2017/0220782 A1* | 8/2017 | Alsanousi | ............ | G06F 21/126 |
| 2017/0337214 A1* | 11/2017 | Ko | .................... | G06F 17/30303 |

\* cited by examiner

SYSTEM AND METHODS FOR APPLICATION DISCOVERY AND TRIAL

CROSS-REFERENCE TO RELATED APPLICATIONS

This application claims priority to U.S. Provisional Application No. 62/183,613 titled SYSTEM AND METHODS FOR A USER INTERFACE AND DEVICE OPERATION filed on Jun. 23, 2015, and U.S. Provisional Application No. 62/184,476 titled SYSTEM AND METHODS FOR A USER INTERFACE AND DEVICE OPERATION filed on Jun. 25, 2015, the content of which is expressly incorporated by reference in its entirety.

FIELD

The present disclosure relates to devices and device configurations, and in particular, to presenting one or more trial applications by a device and controlling operation of the device with respect to the trial application.

BACKGROUND

Mobile devices and personal communication devices are generally used for multiple purposes. There exist many different ways of controlling these devices. With development of applications and device capabilities, there exists a need for device configurations that improve performance and resolve drawbacks of conventional configurations. One area where improvements are needed for devices relates to discovery and trial use of applications.

Regarding conventional methods, processes for download and identification of applications on a device generally require purchase of the application and/or a download process. These requirements can dilute the experience of a user and in many cases can prevent download of applications. In addition, the conventional methods present technical challenges including control of application use and trial. Conventional methods, for example, typically limit use of an application based on duration of time following download. There exists a need to provide configurations which allow for presentation and use of trial applications which improve the process for device operation.

BRIEF SUMMARY OF THE EMBODIMENTS

Disclosed and claimed herein are systems, methods and devices for application discovery and trial. In one embodiment, a method for providing application discovery and trial by a device includes presenting, by a device, a widget element on a display of the device, wherein the widget element includes graphical elements for a plurality of trial applications, and detecting, by the device, a selection of one of the trial applications in the widget element. The method also includes updating, by the device, the display to present a selected trial application based on the selection, wherein presentation of the selected trial application includes display of an overlay element, detecting, by the device, a selection of the overlay element, and presenting, by the device, a trial application control window based on the selection of the overlay element, the trial application control window including graphical elements for one or more of terminating, continuing and conversion of the selected trial application.

In one embodiment, the widget element is a graphical element presented by a user interface of the device as one of a tool bar, selectable icon and overlay window.

In one embodiment, presenting the widget element and plurality of trial applications includes presentation of metadata for each of the plurality of trial applications displayed, wherein the metadata includes a number of times each trial application is viewed and a number of conversions for each trial application.

In one embodiment, the selection of a trial application in the widget element relates to a touch screen command of a graphical element displayed by the device.

In one embodiment, the overlay element is presented as an overlay to presentation of the trial application and wherein the overlay element is selectable and presented during display of the trial application.

In one embodiment, the control window is presented as an overlay to the trial application and wherein functions of the trial application are disabled during presentation of the control window.

In one embodiment, the presentation of trial applications is based on applications provided to the device and one or more selections of to control window presentation.

In one embodiment, the method also includes comprising updating trial applications presented in the widget element.

In one embodiment, the method also includes converting a selected trial application to a non-trial application for the device based on a selection of the control window.

In one embodiment, the method also includes removing the trial application from the device based on selection of the control window.

According to another embodiment, a device is provided including a display configured for presentation of a user interface and a controller configured to control the display and presentation of the user interface. The controller is configured to present a widget element on the display, wherein the widget element includes graphical elements for a plurality of trial applications, and detect a selection of one of the trial applications in the widget element. The controller is also configured to update the display to present a selected trial application based on the selection, wherein presentation of the selected trial application includes display of an overlay element, detect a selection of the overlay element, and present a trial application control window based on the selection of the overlay element, the trial application control window including graphical elements for one or more of terminating, continuing and conversion of the selected trial application.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
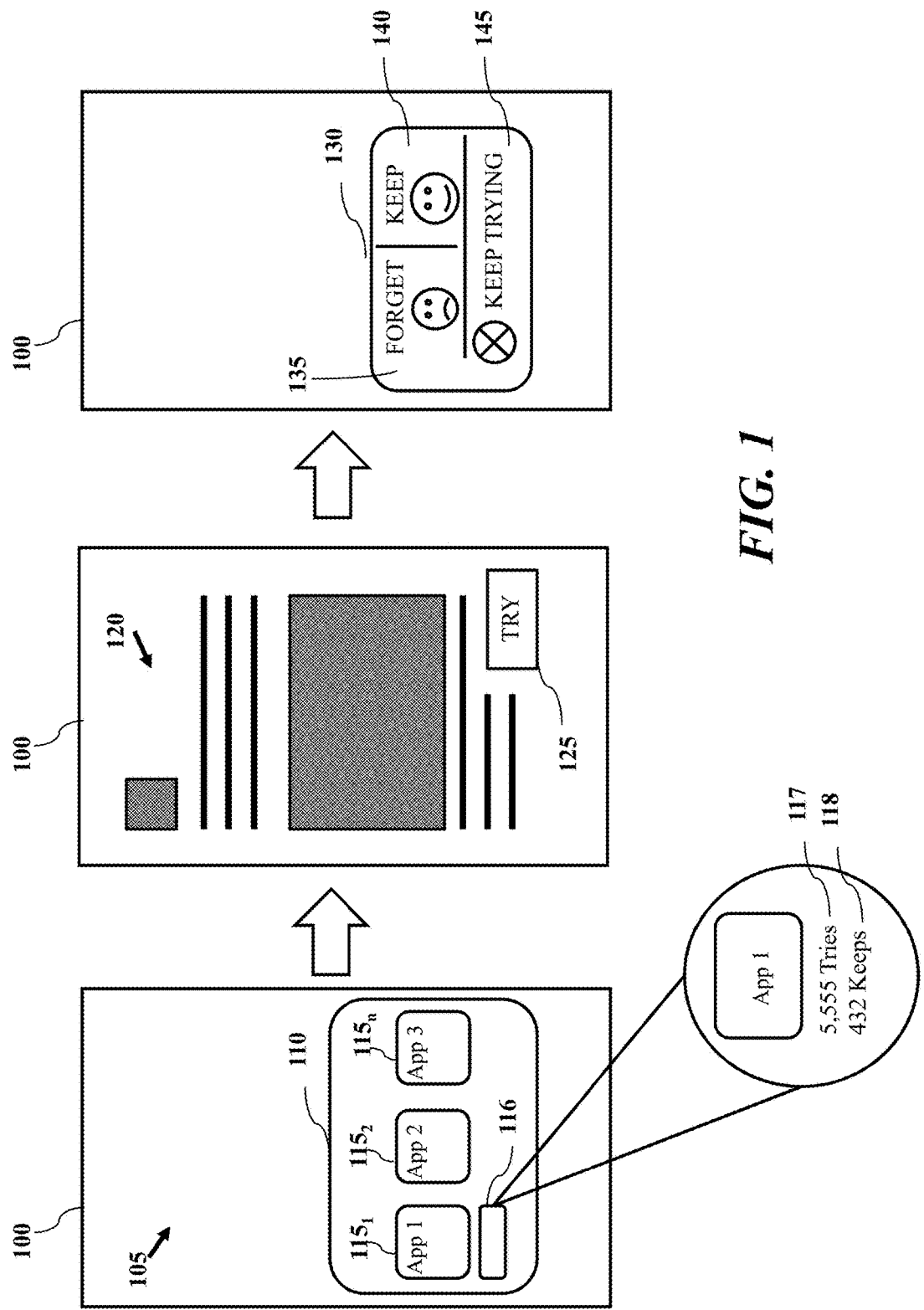
FIG. 1 depicts a graphical representation of application trial and discovery according to one or more embodiments.

One aspect of the disclosure is directed to device configurations for application discovery and trial. One or more embodiments are directed towards presentation of graphical elements to interact with trial applications presented by a device.

According to one embodiment, processes are provided to provide applications to a device, present trial applications to a user of the device and allow for interaction with the user interface and one or more trial applications. With the ever increasing amount of applications available to devices, technical challenges are presented for control and access to applications. Configurations are provided which overcome lag time in downloading/accessing applications, payment for trial applications and/or processes for presentation of trial applications. In addition, configurations provided for herein allow for use of an application, such as trial stage, monitoring use, terminating use and unlocking features of applications. As such one or more particular configurations are provided that improve the performance of a device and solve issues related to device use and access to applications.

As used herein a trial application relates to a computer program (e.g., application) for execution by a device for a predetermined period of time and/or with all or some features of a full application. By way of example, a trial application may include some, but not all, features of an application that can be downloaded to a device. In certain embodiments, a trial application may be provided with a subset of features and/or particular features associated with trial use. In certain embodiments, a trial application can relate to an application that includes one or more features that are locked or disabled. In certain embodiments, trial applications can be converted to a full application (e.g., application that includes all features). Embodiments provided herein relate to problems associated with presenting trial applications, monitoring use, terminating application and allowing continued trial periods of the application.

Application discovery relates to presentation of one or more trial applications by way of a user interface wherein the trial applications can be modified. Trial applications may be presented by a widget element, wherein the trial applications include in the widget element may be changed periodically, where the trial applications may be updated based on access or selection of the widget element, and/or based on time (e.g., every hour, day, week, etc.).

A widget element relates to one or more of a tool bar, display window and graphical element that can be expended and collapsed. With widget element can be accessed during presentation of a user interface including a home or menu configuration and/or during presentation of an application.

According to one or more embodiments, processes are provided for providing discovery and trial of applications. The processes can include presentation of a widget element, overlay element and control window.

One aspect of the disclosure is directed to control configurations for a device and, in particular, to controls and operations for presentation and interaction with trial applications. Devices, such as personal communication devices, portable computers, media players, etc., can be configured with user interfaces including displays and in some cases touch screen capabilities. According to one embodiment, devices may be configured with functionality to provide trial applications.

Applications relate to computer programs operating on a device. The computer programs may be part of the operating platform of the device and may be accessed by a user. Applications of the device may each be associated with a particular purpose. By way of example, the device may include applications for web browsing, communications (e.g., phone, messaging, email, etc.), capturing image data, social media, widgets, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a graphical representation of application trial and discovery according to one or more embodiments. According to one embodiment, devices, an in particular devices including a display and/or controlling a display may be configured to provide an interface for interaction with trial applications. Device display 100 is configured to present user interface 105. According to one embodiment, a device may be configured to present one or more graphical elements for discovery and use of trial applications by way of user interface 105 including widget element 110. FIG. 1 depicts the presentation of one or more elements by display device 100 based on detected interactions associated with widget element 110 and one or more trial applications.

According to one embodiment, widget element 110 may be presented by display device 100 to including a plurality of trial applications $115_{1-n}$ within widget element 110. Widget element 110 is shown as a display window in FIG. 1. According to some embodiments, presentation of widget element 110 may be associated with a tool bar and widget element 110 may be expandable and/or collapsible. Widget element 110 allows a device to curate new content to the mobile device, such as applications. In certain embodiments, all applications presented in widget element 110 are designed to be run in demo/try modes, and are downloaded on a periodic basis (e.g., daily basis, etc.).

In certain embodiments, widget element 110 may be presented based on a selection of user interface 105, such as selection of an icon menu selection, and/to toolbar configuration of widget element 110.

According to one embodiment, each of the trial applications $115_{1-n}$ within widget element 110 are presented as selectable graphical elements. According to another embodiment, trial applications $115_{1-n}$ within widget element 110 may be presented with metadata to include the number of times the application has been tried 117 and the number of times the application has been converted 118 to a device.

Metadata presented in widget element 110 may be received by a device from one or more servers. In that fashion, widget element 110 that presents a number of applications for device users to try including one or more of application name, number of tries, number of keeps and a refresh indicator.

Based on a selection of one of the trial applications $115_{1-n}$ within widget element 110, the device display 100 can present the application, selected trial application 120 including display of an overlay element 125. Overlay element 125 is selectable to allow for one or more actions to be taken with respect to the selected trial application 120. For example, selecting the overlay element 125 (e.g., 'Try' element) provides a user interface to allow for the trial application to be forgotten (e.g., removed from device) or kept (e.g., stored in applications).

According to one embodiment, a selection of the overlay element can allow for device display 100 to present control window 130 including one or more graphical elements. As shown in FIG. 1, control window 130 includes element 135 to allow for the application to be removed from the device (e.g., terminated), element 140 to allow for the application to be kept or converted to the device as a full application (e.g., conversion), and element 145 to allow for the trial application 120 to remain a trial application (e.g., continued as trial).

The configurations of display device 100 are different from automation as download of a full application is not required to trial the application saving memory, time, and search.

Figure 2:
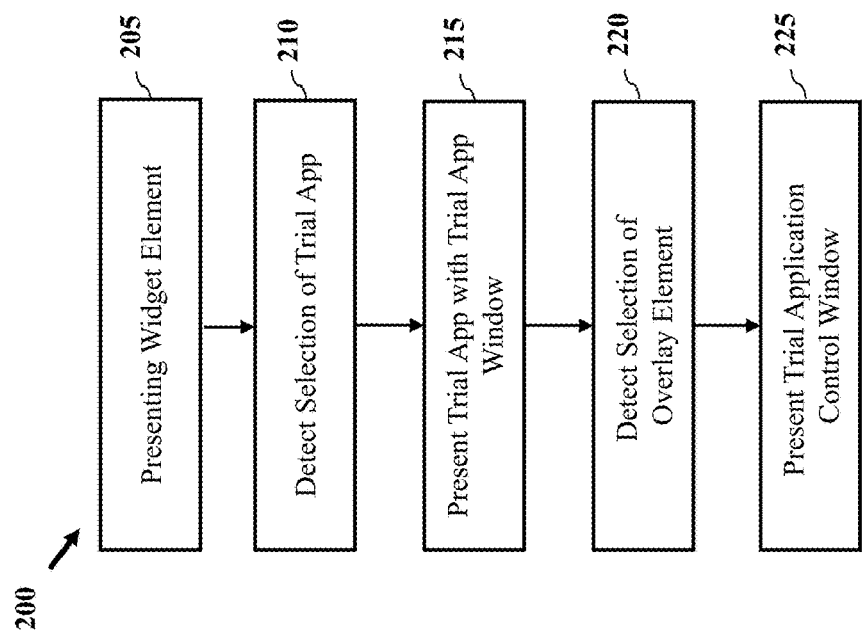
FIG. 2 depicts a process for device operation according to one or more embodiments.

FIG. 2 depicts a process for device operation according to one or more embodiments. According to one embodiment, process 200 may be discovery and trial of applications a device (e.g., display device 100) and interaction with one or more trial applications. Process 200 may be initiated by presenting a widget element on a display of the device at block 205. The widget element is a graphical element presented by a user interface of the device as one of a tool bar, selectable icon and overlay window. The widget element can include graphical elements for a plurality of trial applications. Presenting the widget element and plurality of trial applications includes presentation of metadata for each of the plurality of trial applications displayed, such as a number of times each trial application is viewed and a number of conversions for each trial application. According to one embodiment trial applications are presented in the widget element at block 205 based on one or more trial applications provided to the device, network affiliation, manufacturer trial applications, service providers, etc. Presentation of trial applications can be based on applications provided to the device and one or more selections of to control window presentation.

Based on a detected selection of one of the trial applications in the widget element at block 210, the device can update the display to present the selected trial application at block 215. Selection of a trial application in the widget element at block 210 relates to a touch screen command of a graphical element displayed by the device.

Presentation of the selected trial application at block 215 includes display of an overlay element. The overlay element is presented as an overlay to presentation of the trial application such that the overlay element is selectable and presented during display of the trial application. At block 220, the device detects selection of the overlay element.

At block 225, the device can present a trial application control window based on the selection of the overlay element. The trial application control window presented at block 225 can include graphical elements for one or more of terminating, continuing and conversion of the selected trial application. In addition the control window is presented as an overlay to the trial application such that functions of the trial application are disabled during presentation of the control window.

Process 200 may also include updating trial applications presented in the widget element. According to another embodiment, process 200 may also include converting a selected trial application to a non-trial application for the device based on a selection of the control window. In certain embodiments, process 200 may include removing the trial application from the device based on selection of the control window.

Figure 3:
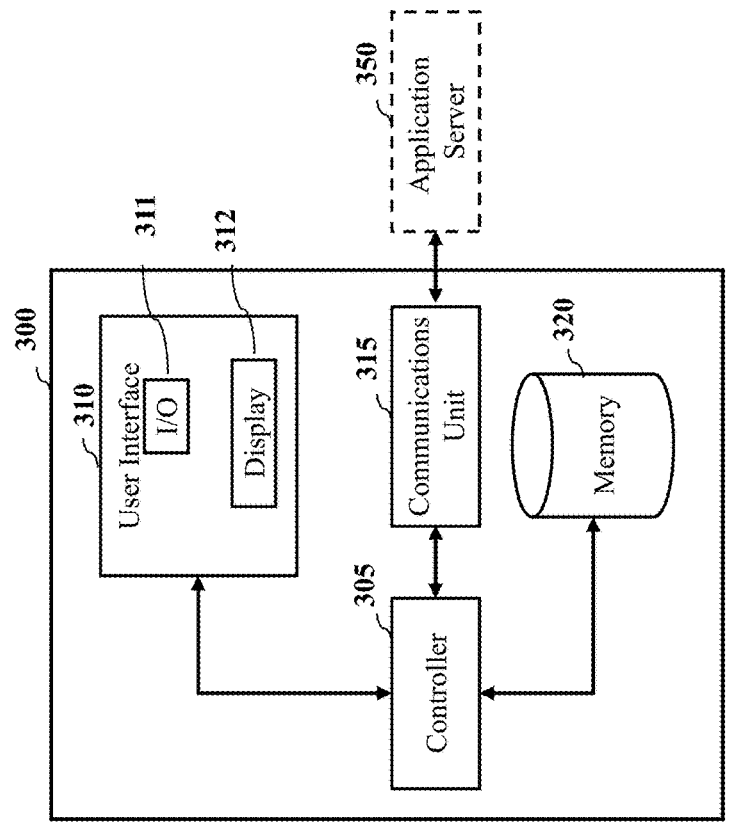
FIG. 3 depicts a graphical representation of a device according to one or more embodiments.

FIG. 3 depicts a graphical representation of a device according to one or more embodiments. According to one embodiment, device 300 is configured for application discovery and trial. FIG. 3 depicts a representation of elements of display device 100 according to one or more embodiments.

Device 300 includes controller 305, user interface 310, communications unit 315, memory 320 and image sensor module 325. Controller 305 may communicate with each of user interface 310, communications unit 315, and memory 320 by way of one or more communication links within device 300.

Device 300 includes controller 305 configured to control presentation of a graphical user interface including one or more of a widget element, overlay element and control window. According to certain embodiments, controller 305 may be configured to selection of a trial application and presentation of a control window.

Controller 305 may be configured to execute code stored in memory 320 for operation of device 300 including presentation of a graphical user interface, overlay windows, graphical elements, etc. Controller 305 may include a processor and/or one or more processing elements. In one embodiment controller 305 may be include one or more of hardware, software, firmware and/or processing components in general.

According to one embodiment, controller 305 may be configured to perform one or more processes described herein. Controller 305 may be configured to present a widget element on the display including graphical elements for a plurality of trial applications, detect a selection of one of the trial applications in the widget element, and update the display to present a selected trial application based on the selection, wherein presentation of the selected trial application includes display of an overlay element. Controller 305 may also be configured to detect a selection of the overlay element and present a trial application control window based on the selection of the overlay element, the trial application control window including graphical elements for one or more of terminating, continuing and conversion of the selected trial application.

User interface 310 is depicted as including an input/output (I/O) interface 311 and display 312. According to one embodiment, commands to device 300 may be detected by display 312, such as swipe, slide, contact, touch stylus, and touch screen commands. Device 300 includes display 312 configured for presentation of a user interface. User interface 310 may be configured to receive one or more commands via an input/output (I/O) interface 311 which may include one or more inputs or terminals to receive user commands.

Communications unit 315 may be configured to allow for transmission and reception of data relative to device 300. Communications unit 315 may be configured for wired and/or wireless communication with one or more network elements, such as application server 350 (not part of device 300 by way of network communication. Memory 320 may be configured to store data captured by device 300 and to store instructions for operation of device 300. Memory 320 may include non-transitory RAM and/or ROM memory for storing executable instructions, operating instructions and content for display.

Figure 4B:
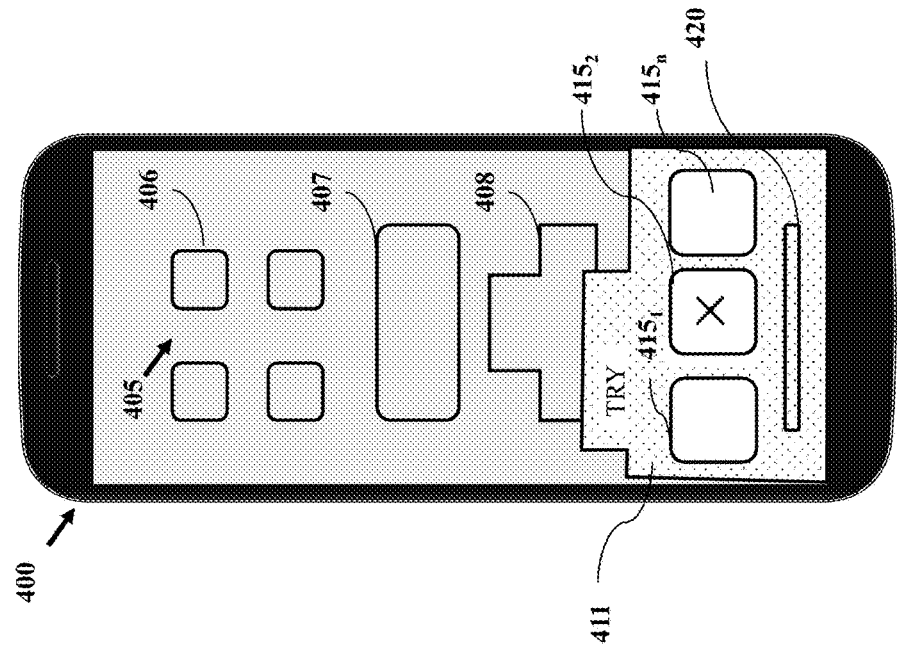
FIGS. 4A-4B depict graphical representations of a widget element according to one or more embodiments.
Figure 4A:
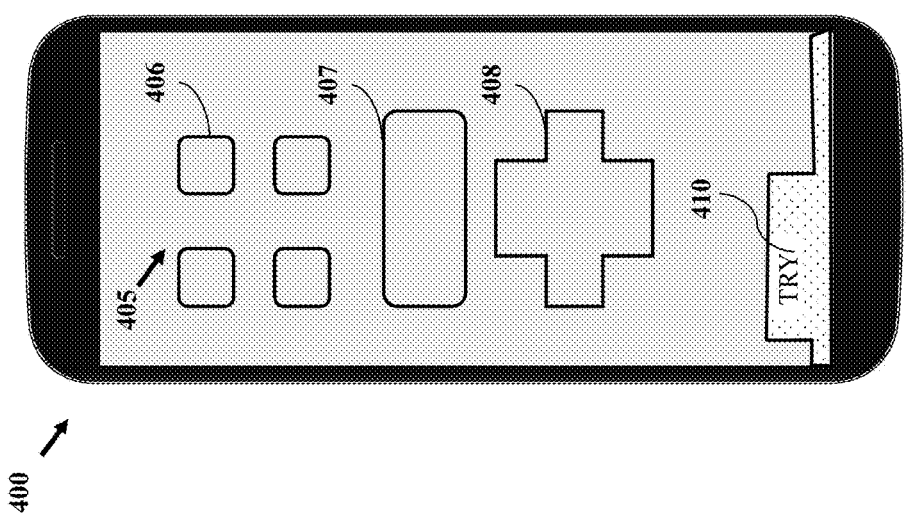

FIGS. 4A-4B depict graphical representations of a widget element according to one or more embodiments. Referring to FIG. 4A, device 400 is configured to display a user interface 405 including a plurality of graphical elements 406, 407 and 408 associated with an application. User interface 405 may be configured to present overlay element 410 shown in a collapsed position. According to one or more embodiments, based on selection of overlay element 410, user interface 405 may update the presentation of elements to include an expanded overlay element 411 in FIG. 4B. Expanded overlay element 411 includes one or more selectable elements 415$_{1-n}$ and 420 associated with presentation of a trial application.

While this disclosure has been particularly shown and described with references to exemplary embodiments thereof, it will be understood by those skilled in the art that various changes in form and details may be made therein without departing from the scope of the claimed embodiments.

What is claimed is:

1. A method for providing application discovery and trial by a device, the method comprising:
   presenting, by a device, a widget element on a display of the device, wherein the widget element includes graphical elements for a plurality of trial applications;
   detecting, by the device, a selection of one of the trial applications in the widget element;
   updating, by the device, the display to present a selected trial application based on the selection, wherein the selected trial application is executed by the device and presentation of the selected trial application includes display of an overlay element, wherein the overlay element is presented as an overlay to the executed trial application and wherein the overlay element is selectable;
   detecting, by the device, a selection of the overlay element; and
   presenting, by the device, a trial application control window based on the selection of the overlay element, the trial application control window including graphical elements for one or more of terminating, continuing and conversion of the selected trial application, wherein the trial application control window is presented as an overlay to the executed trial application and wherein functions of the executed trial application are disabled during presentation of the trial application control window.

2. The method of claim 1, wherein the widget element is a graphical element presented by the user interface of the device as one of a tool bar, selectable icon and overlay window.

3. The method of claim 1, wherein presenting the widget element and plurality of trial applications includes presentation of metadata for each of the plurality of trial applications displayed, wherein the metadata includes a number of times each trial application is viewed and a number of conversions for each trial application.

4. The method of claim 1, wherein the selection of a trial application in the widget element relates to a touch screen command of a graphical element for the trial application displayed by the device.

5. The method of claim 1, wherein the overlay element is configured for display in each of a collapsed position and an expanded overlay element, wherein the expanded overlay element is presented as the trial application control window in response to selection of the overlay element.

6. The method of claim 1, wherein the presentation of trial applications in the widget element is based on applications provided to the device and one or more selections of the trial application control window presentation.

7. The method of claim 1, further comprising updating trial applications presented in the widget element.

8. The method of claim 1, further comprising converting a selected trial application to a non-trial application for the device based on a selection in the trial application control window.

9. The method of claim 1, further comprising removing the trial application from the device based on selection in the trial application control window.

10. A device comprising:
    a display configured for presentation of a user interface; and
    a controller configured to control the display and presentation of the user interface, wherein the controller is configured to:
    present a widget element on the display, wherein the widget element includes graphical elements for a plurality of trial applications;
    detect a selection of one of the trial applications in the widget element;
    update the display to present a selected trial application based on the selection, wherein the selected trial application is executed by the device and presentation of the selected trial application includes display of an overlay element, wherein the overlay element is presented as an overlay to the executed trial application and wherein the overlay element is selectable;
    detect a selection of the overlay element; and
    present a trial application control window based on the selection of the overlay element, the trial application control window including graphical elements for one or more of terminating, continuing and conversion of the selected trial application, wherein the trial application control window is presented as an overlay to the executed trial application and wherein functions of the executed trial application are disabled during presentation of the trial application control window.

11. The device of claim 10, wherein the widget element is a graphical element presented by the user interface of the device as one of a tool bar, selectable icon and overlay window.

12. The device of claim 10, wherein presenting the widget element and plurality of trial applications includes presentation of metadata for each of the plurality of trial applications displayed, wherein the metadata includes a number of times each trial application is viewed and a number of conversions for each trial application.

13. The device of claim 10, wherein the selection of a trial application in the widget element relates to a touch screen command of a graphical element for the trial application displayed by the device.

14. The device of claim 10, wherein the overlay element is configured for display in each of a collapsed position and an expanded overlay element, wherein the expanded overlay element is presented as the trial application control window in response to selection of the overlay element.

15. The device of claim 10, wherein the presentation of trial applications in the widget element is based on applications provided to the device and one or more selections of the trial application control window presentation.

16. The device of claim 10, wherein the controller is further configured to update trial applications presented in the widget element.

17. The device of claim 10, wherein the controller is further configured to select trial application to a non-trial application for the device based on a selection in the trial application control window.

18. The device of claim 10, wherein the controller is further configured to remove the trial application from the device based on selection in the trial application control window.

* * * * *